(12) United States Patent
Ho

(10) Patent No.: US 9,274,618 B2
(45) Date of Patent: Mar. 1, 2016

(54) ACTIVE CAPACITIVE TOUCH PEN

(71) Applicant: WALTOP INTERNATIONAL CORPORATION, Hsinchu County (TW)

(72) Inventor: Yu-Chieh Ho, Miaoli County (TW)

(73) Assignee: WALTOP INTERNATIONAL CORPORATION, Hsinchu County (TW)

( * ) Notice: Subject to any disclaimer, the term of this patent is extended or adjusted under 35 U.S.C. 154(b) by 0 days.

(21) Appl. No.: 14/087,173

(22) Filed: Nov. 22, 2013

(65) Prior Publication Data

US 2015/0091844 A1 Apr. 2, 2015

(30) Foreign Application Priority Data

Oct. 2, 2013 (TW) .............................. 102135664 U

(51) Int. Cl.
*G06F 3/033* (2013.01)
*G06F 3/0354* (2013.01)
*G06F 3/044* (2006.01)

(52) U.S. Cl.
CPC ............ *G06F 3/03545* (2013.01); *G06F 3/044* (2013.01)

(58) Field of Classification Search
CPC ..... G06F 3/0421; G06F 3/042; G06F 3/0428; G06F 3/03545; G06F 3/044; G06F 3/0425; G06F 2203/04106; G06F 2203/04808; G06F 3/04883; G06F 3/046; G06F 3/0416; G06F 1/1643; G06F 3/045; G06F 1/1616; G06F 2203/04104; G06F 3/04
USPC .................................. 345/156, 173, 179–181
See application file for complete search history.

(56) References Cited

U.S. PATENT DOCUMENTS

| | | | |
|---|---|---|---|
| 8,199,132 B1 * | 6/2012 | Oda et al. ...................... | 345/179 |
| 2010/0212976 A1 * | 8/2010 | Baba ........................... | 178/19.01 |
| 2012/0154340 A1 * | 6/2012 | Vuppu et al. .................. | 345/179 |
| 2014/0028633 A1 * | 1/2014 | Mercea et al. ................ | 345/179 |
| 2014/0300585 A1 * | 10/2014 | Dowd et al. ................... | 345/179 |

FOREIGN PATENT DOCUMENTS

| | | |
|---|---|---|
| JP | S6170629 A | 4/1986 |
| TW | 499657 | 8/2002 |
| TW | 201131434 A1 | 9/2011 |
| TW | 201339907 A | 10/2013 |

* cited by examiner

*Primary Examiner* — Duc Dinh
(74) *Attorney, Agent, or Firm* — Li & Cai Intellectual Property (USA) Office

(57) ABSTRACT

An active capacitive touch pen includes a casing unit, a circuit unit, a power supply unit and a pen head unit. The casing unit includes a pen-shaped casing structure. The circuit unit includes a circuit substrate disposed inside the pen-shaped casing structure and at least one varistor disposed inside the pen-shaped casing structure and electrically connected to the circuit substrate. The power supply unit includes at least one power supply component disposed inside the pen-shaped casing structure and electrically connected to the circuit substrate. The pen head unit includes a pen head structure movably disposed inside the pen-shaped casing structure and an elastic structure disposed between the pen head structure and the varistor. The pen head structure has an exposed contacting portion exposed from the pen-shaped casing structure. Whereby, a predetermined pressure generated by pushing the pen head structure is transmitted to the varistor through the elastic structure.

5 Claims, 4 Drawing Sheets

ACTIVE CAPACITIVE TOUCH PEN

BACKGROUND OF THE INVENTION

1. Field of the Invention

The instant disclosure relates to an active capacitive touch pen, and more particularly to an active capacitive touch pen using at least one varistor for determining the degree of pressure when a user uses the active capacitive touch pen on the handwritten board.

2. Description of Related Art

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor, and an electromagnetic touch control device requires a special battery powered pen for input; while the working principle of a capacitive touch control device relies on capacitive coupling, which takes place as soon as the capacitive touch sensor is touched by a conductive object, and the touch position can then be identified according to the variation in capacitance at the touch point. Therefore, a capacitive touch control device does not require an input pen that consumes electricity. Nor is it necessary to subject a capacitive touch sensor to concentrated pressure application for deformation, and thus a capacitive touch control device has a longer service life. Furthermore, mass production of capacitive touch control devices requires lower costs due to its simple construction, less components and higher yield rate.

A capacitive touch control device can be operated in many ways. The most common of all is using a conductor, for example a finger or a pen, to touch or slide on the surface of the capacitive touch control device, for the capacitive touch sensor thereof to generate a response signal. However, as capacitive touch control devices find more and more applications, the lower precision on position detection tends to hinder smoothness of operation where more precise and more efficient detection is required, such as in handheld devices. In order to enable enhanced precision on position detection, many people choose to use pens for capacitive touch input.

SUMMARY OF THE INVENTION

One aspect of the instant disclosure relates to an active capacitive touch pen using at least one varistor for determining the degree of pressure when a user uses the active capacitive touch pen on the handwritten board.

One of the embodiments of the instant disclosure provides an active capacitive touch pen, comprising: a casing unit, a circuit unit, a power supply unit and a pen head unit. The casing unit includes a pen-shaped casing structure. The circuit unit includes a circuit substrate disposed inside the pen-shaped casing structure and at least one varistor disposed inside the pen-shaped casing structure, wherein the at least one varistor is disposed on a lateral side of the circuit substrate and electrically connected to the circuit substrate. The power supply unit includes at least one power supply component disposed inside the pen-shaped casing structure and electrically connected to the circuit substrate. The pen head unit includes a pen head structure movably disposed inside the pen-shaped casing structure and an elastic structure disposed between the pen head structure and the at least one varistor, wherein the pen head structure has an exposed contacting portion exposed from the pen-shaped casing structure, and a predetermined pressure generated by pushing the pen head structure is transmitted to the at least one varistor through the elastic structure.

Another one of the embodiments of the instant disclosure provides an active capacitive touch pen, comprising: a casing unit, a circuit unit, a power supply unit and a pen head unit. The casing unit includes a pen-shaped casing structure. The circuit unit includes a circuit substrate disposed inside the pen-shaped casing structure and at least one varistor disposed inside the pen-shaped casing structure and electrically connected to the circuit substrate. The pen head unit is disposed inside the pen-shaped casing structure, wherein the pen head unit includes a pen head structure and an elastic structure, and a predetermined pressure generated by pushing the pen head structure is transmitted to the at least one varistor through the elastic structure.

More precisely, the pen-shaped casing structure includes a hollow metal outer tube, a hollow plastic inner tube, a pen tail cover body and a pen head cover body, one side end portion of the hollow plastic inner tube and one side end portion of the hollow metal outer tube are mated with each other, the pen tail cover body and another side end portion of the hollow metal outer tube are mated with each other, and the pen head cover body and another side end portion of the hollow plastic inner tube are matched with each other.

More precisely, the at least one power supply component is a replaceable battery disposed inside the hollow metal outer tube and between the circuit substrate and pen tail cover body, the circuit substrate is disposed inside the hollow plastic inner tube and between the at least one varistor and the at least one power supply component, and the at least one varistor is disposed inside the pen head cover body and between the elastic structure and the circuit substrate.

More precisely, the circuit unit includes a first support body for supporting the circuit substrate, a second support body connected with the first support body for supporting the at least one varistor, and a changeover switch disposed on the circuit substrate, and the pen-shaped casing structure includes a power button passing through the hollow metal outer tube and the hollow plastic inner tube to contact the changeover switch.

More precisely, the pen head unit includes a position limiting sleeve disposed inside the pen head cover body and positioned between the pen head cover body and the second support body, the pen head structure is movably disposed inside the position limiting sleeve, and the exposed contacting portion of the pen head structure is exposed from the position limiting sleeve.

More precisely, the position limiting sleeve has a first receiving space formed therein and a second receiving space formed therein to communicate with the first receiving space, and the diameter of the first receiving space is smaller than the diameter of the second receiving space, wherein the pen head structure has a first pen head portion passing through the first receiving space and partially exposed outside the first receiving space and a second pen head portion connected with the first pen head portion and positioned inside the second receiving space, wherein the position limiting sleeve has at least two corresponding retaining blocks disposed on an outer surface thereof, and the second support body has at least two corresponding retaining grooves respectively mated with the at least two retaining blocks for retaining the position limiting sleeve on the second support body.

More precisely, the circuit unit includes a first conductive element and a second conductive element separated from the first conductive element by a predetermined distance, the first conductive element is disposed on the circuit substrate and electrically connected between the circuit substrate and the hollow metal outer tube, and the second conductive element is disposed on the circuit substrate and electrically connected between the circuit substrate and the pen head cover body, wherein the elastic structure includes an elastic main body disposed between the pen head structure and the at least one varistor and an elastic element disposed between the pen head structure and the at least one varistor and around the elastic main body.

Therefore, the at least one varistor can be used to determine the degree of pressure when a user uses the active capacitive touch pen on the handwritten board, thus the at least one varistor then shows lines on the handwritten board, and the lines may have different thickness according to the degree of pressure.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
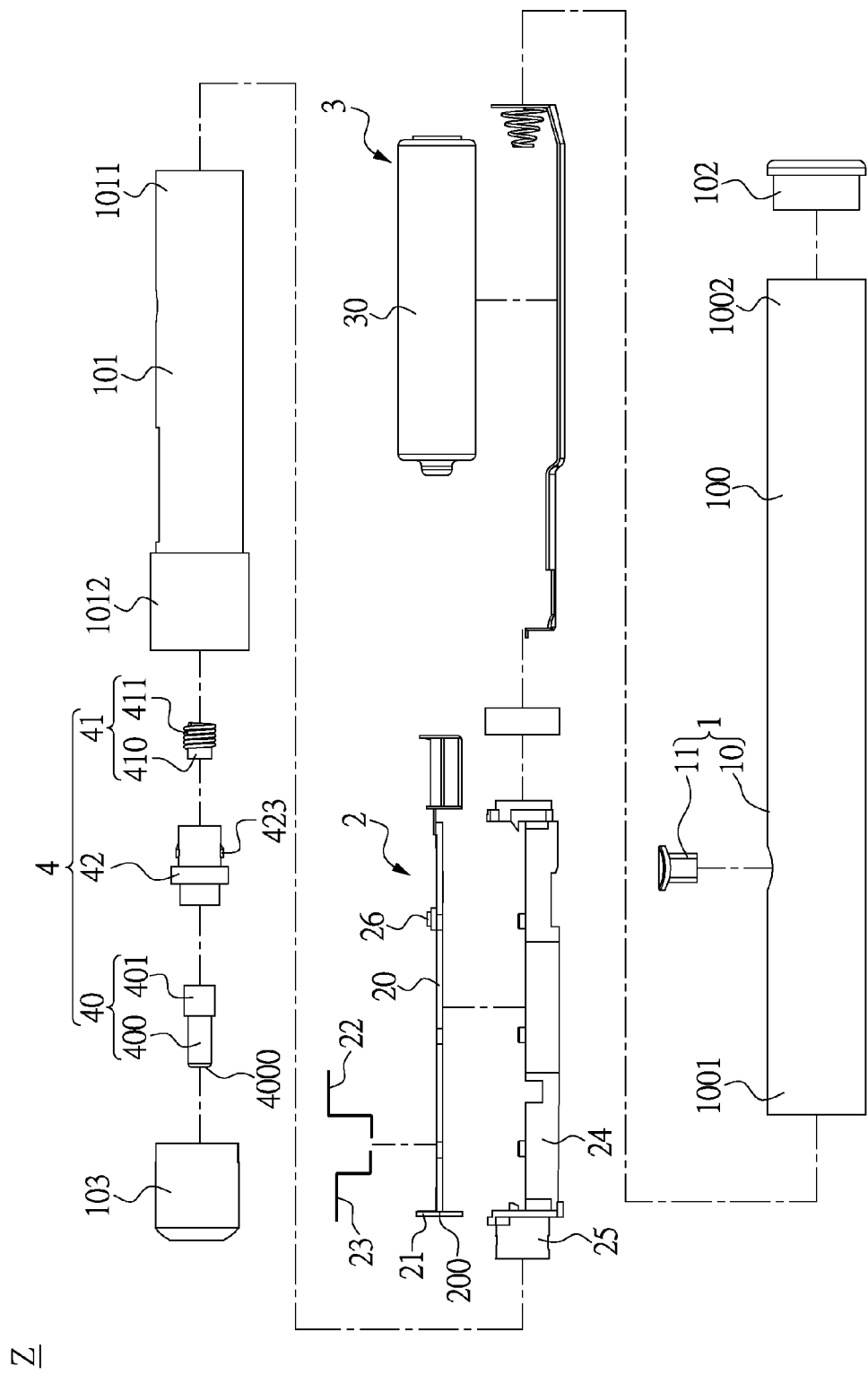
FIG. 1 is a lateral, exploded, schematic diagram of the active capacitive touch pen of the instant disclosure.
Figure 2:
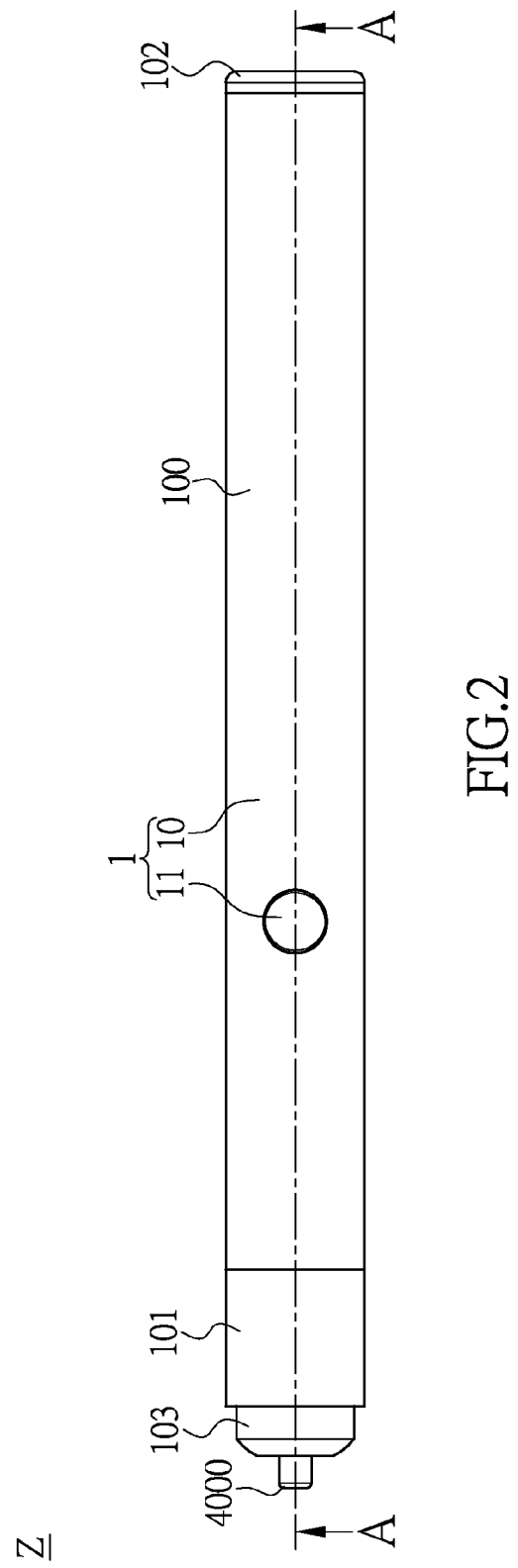
FIG. 2 is a lateral, assembled, schematic diagram of the active capacitive touch pen of the instant disclosure.
Figure 3:
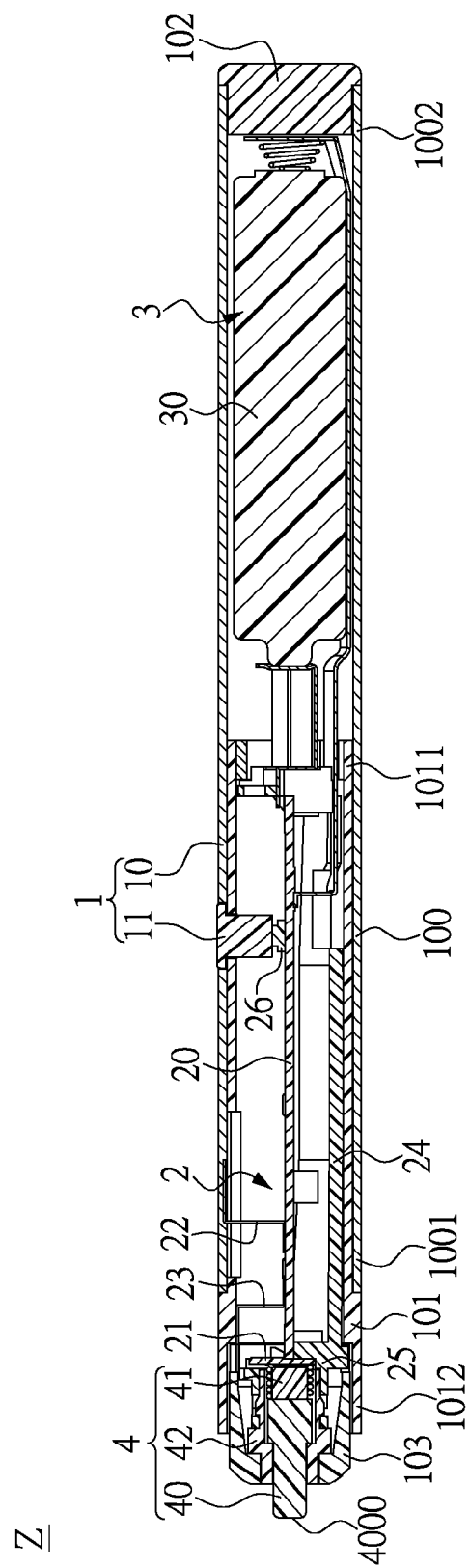
FIG. 3 shows a cross-sectional view taken along the section line A-A of FIG. 2.
Figure 4:
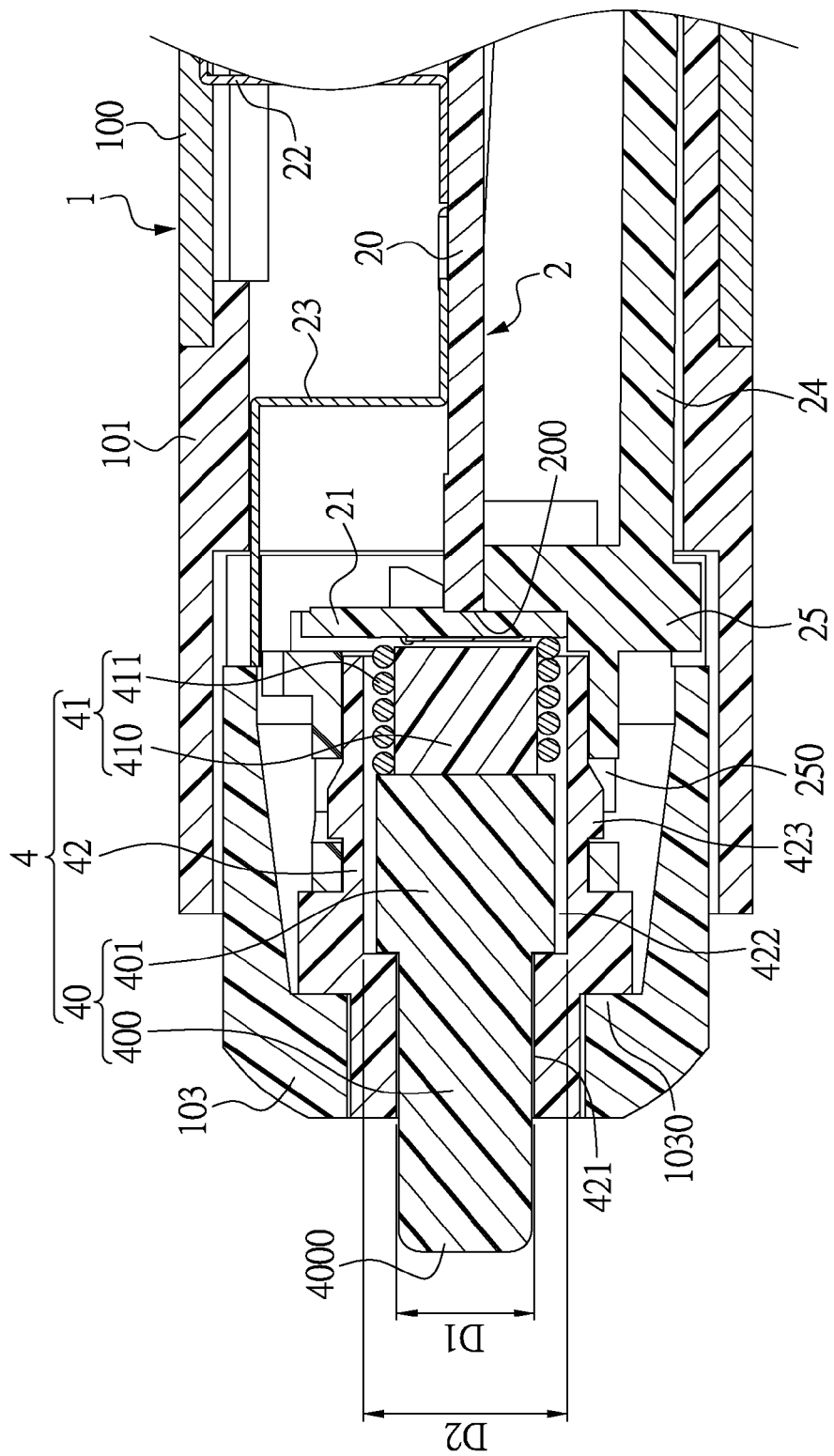
FIG. 4 shows a partial enlarged view of FIG. 3.

Referring to FIG. 1 to FIG. 4, where FIG. 1 is a lateral, exploded, schematic diagram, FIG. 2 is a lateral, assembled, schematic diagram, FIG. 3 shows a cross-sectional view taken along the section line A-A of FIG. 2, and FIG. 4 shows a partial enlarged view of FIG. 3. The instant disclosure provides an active capacitive touch pen (stylus pen) Z, comprising: a casing unit 1, a circuit unit 2, a power supply unit 3 and a pen head unit 4.

First, referring to FIG. 1, FIG. 2 and FIG. 3, the casing unit includes a pen-shaped casing structure 10. More precisely, the pen-shaped casing structure 10 includes a hollow metal outer tube 100, a hollow plastic inner tube 101, a pen tail cover body 102 and a pen head cover body 103. One side end portion (such as a first side end portion 1011) of the hollow plastic inner tube 101 and one side end portion (such as a first side end portion 1001) of the hollow metal outer tube 100 are mated with each other, for example, the first side end portion 1011 of the hollow plastic inner tube 101 is inserted into the first side end portion 1001 of the hollow metal outer tube 100. The pen tail cover body 102 and another side end portion (such as a second side end portion 1002 opposite to the first side end portion 1001) of the hollow metal outer tube 100 are mated with each other, for example, the end part of the pen tail cover body 102 is inserted into the second side end portion 1002 of the hollow metal outer tube 100. The pen head cover body 103 and another side end portion (such as a second side end portion 1012 opposite to the first side end portion 1011) of the hollow plastic inner tube 101 are matched with each other, for example, the end part of the pen head cover body 103 is inserted into the second side end portion 1012 of the hollow plastic inner tube 101. For example, both the hollow metal outer tube 100 and the pen head cover body 103 can be made of copper material, but it is merely an example and is not meant to limit the instant disclosure.

Moreover, referring to FIG. 2 and FIG. 3, the circuit unit 2 includes a circuit substrate 20 disposed inside the pen-shaped casing structure 10 and at least one varistor 21 disposed inside the pen-shaped casing structure 10, and the at least one varistor 21 is disposed on a lateral side 200 of the circuit substrate 20 and electrically connected to the circuit substrate 20. More precisely, the circuit unit 2 includes a first conductive element 22 (such as an elastic piece or a spring plate) and a second conductive element 23 (such as an elastic piece or a spring plate) separated from the first conductive element 22 by a predetermined distance. The first conductive element 22 is disposed on the circuit substrate 20 and electrically connected between the circuit substrate 20 and the hollow metal outer tube 100, and the second conductive element 23 is disposed on the circuit substrate 20 and electrically connected between the circuit substrate 20 and the pen head cover body 103. In addition, the varistor 21 is an electronic component with a "diode-like" nonlinear current-voltage characteristic. The varistor 21 is also called as variable resistor or voltage dependent resistor (VDR).

Furthermore, referring to FIG. 2 and FIG. 3, the power supply unit 3 includes at least one power supply component 30 disposed inside the pen-shaped casing structure 10, and the at least one power supply component 30 is electrically connected to the circuit substrate 20 to provide a predetermined voltage for the circuit unit 2. More precisely, the at least one power supply component 30 may be a replaceable battery disposed inside the hollow metal outer tube 100 and between the circuit substrate 20 and pen tail cover body 102, and the circuit substrate 20 is disposed inside the hollow plastic inner tube 101 and between the at least one varistor 21 and the at least one power supply component 30.

In addition, referring to FIG. 1, FIG. 3 and FIG. 4, the pen head unit 4 includes a pen head structure 40 movably disposed inside the pen-shaped casing structure 10 and an elastic structure 41 disposed between the pen head structure 40 and the at least one varistor 21. More precisely, the pen head structure 40 has an exposed contacting portion 4000 exposed from the pen-shaped casing structure 10, and the elastic structure 41 includes an elastic main body 410 (such as an elastic cylinder made of rubber material) disposed between the pen head structure 40 and the at least one varistor 21 and an elastic element 411 (such as a compression spring disposed around the elastic cylinder) disposed between the pen head structure 40 and the at least one varistor 21 and around the elastic main body 410. Whereby, the at least one varistor 21 is disposed inside the pen head cover body 103 and between the elastic structure 41 and the circuit substrate 20, thus when the pen head structure 40 is pushed, a predetermined pressure generated by pushing the pen head structure 40 is transmitted to the at least one varistor 21 through the elastic structure 41.

For example, when a predetermined pressure generated by pushing the pen head structure 40 is transmitted to the at least one varistor 21 through the elastic structure 41, the at least one varistor 21 receives the predetermined pressure and transmits the predetermined pressure to the CPU chip (not shown) of the circuit substrate 20 for calculation. Therefore, the at least one varistor 21 determines the degree of pressure when a user uses the active capacitive touch pen Z. The at least one varistor 21 then shows lines on the handwritten board. The lines may have different thickness according to the degree of pressure.

More precisely, referring to FIG. 3 and FIG. 4, the circuit unit 2 includes a first support body 24 for supporting the circuit substrate 20, a second support body 25 connected with the first support body 24 for supporting or receiving the at least one varistor 21, and a changeover switch 26 disposed on the circuit substrate 20, and the pen-shaped casing structure 10 includes a power button 11 passing through the hollow metal outer tube 100 and the hollow plastic inner tube 101 to contact the changeover switch 26. Thus, the user can switch on or off the changeover switch 26 by pushing the power button 11. For example, when the changeover switch 26 is switched on by pushing the power button 11, the at least one power supply component 30 can provide power for the circuit substrate 20, thus the active capacitive touch pen Z is in power on mode. When the changeover switch 26 is switched off by pushing the power button 11, the at least one power supply component 30 cannot provide power for the circuit substrate 20, thus the active capacitive touch pen Z is in power off mode.

More precisely, referring to FIG. 3 and FIG. 4, the pen head unit 4 includes a position limiting sleeve 42 disposed inside the pen head cover body 103 and positioned between the pen head cover body 103 and the second support body 25 (i.e., the position limiting sleeve 42 is retained between the pen head cover body 103 and the second support body 25). The pen head structure 40 is movably disposed inside the position limiting sleeve 42, and the exposed contacting portion 4000 of the pen head structure 40 is exposed from the position limiting sleeve 42. For example, the position limiting sleeve 42 has a first receiving space 421 formed therein and a second receiving space 422 formed therein to communicate with the first receiving space 421, and the diameter D1 of the first receiving space 421 is smaller than the diameter D2 of the second receiving space 422. The pen head structure 40 has a first pen head portion 400 passing through the first receiving space 421 and partially exposed outside the first receiving space 421 and a second pen head portion 401 connected with the first pen head portion 400 and positioned inside the second receiving space 422, thus the second pen head portion 401 of the pen head structure 40 only can be moved inside the second receiving space 422 of the position limiting sleeve 42. Whereby, the design of the position limiting sleeve 42 can prevent the pen head structure 40 from being separated from the pen head cover body 103.

Furthermore, referring to FIG. 3 and FIG. 4, the position limiting sleeve 42 has at least two corresponding retaining blocks 423 disposed on an outer surface of the position limiting sleeve 42, and the second support body 25 has at least two corresponding retaining grooves 250 respectively mated with the at least two retaining blocks 423 for retaining the position limiting sleeve 42 on the second support body 25. In other words, one end portion of the position limiting sleeve 42 can be retained on the second support body 25 by matching the at least two corresponding retaining blocks 423 and the at least two corresponding retaining grooves 250, and another end portion of the position limiting sleeve 42 can be abutted against an annular position limiting block 1030 disposed on the inner surface of the pen head cover body 103. Whereby, the position limiting sleeve 42 can be firmly retained between the second support body 25 and the pen head cover body 103 for preventing the pen head structure 40 from being separated from the pen head cover body 103.

In conclusion, the at least one varistor 21 can be used to determine the degree of pressure when a user uses the active capacitive touch pen Z on the handwritten board, thus the at least one varistor 21 then shows lines on the handwritten board, and the lines may have different thickness according to the degree of pressure.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An active capacitive touch pen, comprising:
    a casing unit including a pen-shaped casing structure;
    a circuit unit including a circuit substrate disposed inside the pen-shaped casing structure and at least one varistor disposed inside the pen-shaped casing structure and electrically connected to the circuit substrate; and
    a pen head unit disposed inside the pen-shaped casing structure, wherein the pen head unit includes a pen head structure and an elastic structure, and a predetermined pressure generated by pushing the pen head structure is transmitted to the at least one varistor through the elastic structure;
    wherein the elastic structure includes an elastic main body disposed between the pen head structure and the at least one varistor and an elastic element disposed between the pen head structure and the at least one varistor and around the elastic main body;
    wherein the pen-shaped casing structure includes a hollow metal outer tube and a pen head cover body, the circuit unit includes a first conductive element and a second conductive element separated from the first conductive element by a predetermined distance, the first conductive element is disposed on the circuit substrate and electrically connected between the circuit substrate and the hollow metal outer tube, and the second conductive element is disposed on the circuit substrate and electrically connected between the circuit substrate and the pen head cover body.

2. The active capacitive touch pen of claim 1, wherein the pen-shaped casing structure includes a hollow plastic inner tube and a pen tail cover body, one side end portion of the hollow plastic inner tube and one side end portion of the hollow metal outer tube are mated with each other, the pen tail cover body and another side end portion of the hollow metal outer tube are mated with each other, and the pen head cover body and another side end portion of the hollow plastic inner tube are matched with each other.

3. The active capacitive touch pen of claim 2, wherein the circuit unit includes a first support body for supporting the circuit substrate, a second support body connected with the first support body for supporting the at least one varistor, and a changeover switch disposed on the circuit substrate, the pen-shaped casing structure includes a power button passing through the hollow metal outer tube and the hollow plastic inner tube to contact the changeover switch, and the at least one varistor is disposed inside the pen head cover body and between the elastic structure and the circuit substrate.

4. The active capacitive touch pen of claim 3, wherein the pen head unit includes a position limiting sleeve disposed inside the pen head cover body and positioned between the pen head cover body and the second support body, the pen head structure is movably disposed inside the position limiting sleeve, and the pen head structure has an exposed contacting portion exposed from the position limiting sleeve.

5. The active capacitive touch pen of claim 4, wherein the position limiting sleeve has a first receiving space formed therein and a second receiving space formed therein to communicate with the first receiving space, and the diameter of the first receiving space is smaller than the diameter of the second receiving space, wherein the pen head structure has a first pen head portion passing through the first receiving space and partially exposed outside the first receiving space and a second pen head portion connected with the first pen head portion and positioned inside the second receiving space, wherein the position limiting sleeve has at least two corresponding retaining blocks disposed on an outer surface thereof, and the second support body has at least two corresponding retaining grooves respectively mated with the at least two retaining blocks for retaining the position limiting sleeve on the second support body.

* * * * *